United States Patent
la O' et al.

(10) Patent No.: US 8,415,039 B2
(45) Date of Patent: Apr. 9, 2013

(54) HIGH TEMPERATURE METAL-HALOGEN FLOW BATTERY WITH NON-AQUEOUS MOLTEN SALT ELECTROLYTE

(75) Inventors: Gerardo Jose la O', Alameda, CA (US); Rick Winter, Orinda, CA (US)

(73) Assignee: Primus Power Corporation, Hayward, CA (US)

(*) Notice: Subject to any disclaimer, the term of this patent is extended or adjusted under 35 U.S.C. 154(b) by 207 days.

(21) Appl. No.: 13/036,672

(22) Filed: Feb. 28, 2011

(65) Prior Publication Data

US 2012/0219832 A1   Aug. 30, 2012

(51) Int. Cl.
*H01M 2/38* (2006.01)
*H01M 8/18* (2006.01)

(52) U.S. Cl. .......... 429/50; 429/199; 429/454; 429/462; 429/464

(58) Field of Classification Search .................... 429/50, 429/199, 454, 462, 464
See application file for complete search history.

(56) References Cited

U.S. PATENT DOCUMENTS

| | | | |
|---|---|---|---|
| 3,912,999 | A | 10/1975 | England |
| 5,972,533 | A | 10/1999 | Coetzer et al. |
| 6,544,691 | B1 | 4/2003 | Guidotti |

OTHER PUBLICATIONS

K. Nitta et al., "Physicochemical Properties of ZnCl2-NaCl-KCl Eutectic Melt," Electrochimica Acta 54 (2009), 4898-4902, Copyright 2009 Elsevier Ltd.

*Primary Examiner* — Patrick Ryan
*Assistant Examiner* — Ladan Mohaddes
(74) *Attorney, Agent, or Firm* — The Marbury Law Group PLLC

(57) ABSTRACT

An apparatus including at least one electrochemical flow cell in which the electrochemical flow cell includes an anode electrode, a cathode electrode and a reaction zone between the anode and the cathode. The electrochemical flow cell also includes an electrolyte storage reservoir configured to hold a molten salt electrolyte and a gas generated during charging of the at least one electrochemical flow cell and at least one conduit configured to supply the molten salt electrolyte and the gas from the storage reservoir to the at least one electrochemical flow cell. The electrochemical flow cell also includes at least one pump configured to pump the molten salt electrolyte from the storage reservoir to the reaction zone.

11 Claims, 7 Drawing Sheets

Temperature dependence of density for the ZnCl$_2$–NaCl–KCl eutectic melt.

An Arrhenius plot of viscosity for the ZnCl$_2$–NaCl–KCl eutectic melt.

An Arrhenius plot of ionic conductivity for the $ZnCl_2$-NaCl-KCl eutectic melt.

HIGH TEMPERATURE METAL-HALOGEN FLOW BATTERY WITH NON-AQUEOUS MOLTEN SALT ELECTROLYTE

FIELD

The present invention is directed to flow batteries and in particular to a high temperature flow battery with a non-aqueous molten salt electrolyte.

BACKGROUND

A flow battery is a form of rechargeable battery in which electrolyte containing one or more dissolved electroactive species flows through an electrochemical cell that converts chemical energy directly to electricity. Additional electrolyte is typically stored externally, generally in tanks, and is usually pumped through the cell (or cells) of the reactor by a pump. Flow batteries may be rapidly recharged by replacing the electrolyte liquid (in a similar way to refilling fuel tanks for internal combustion engines). The spent electrolyte materials may be recovered for re-use.

The use of external storage allows independent scale up of power and energy density specifications. External storage of reactants also avoids self-discharge that is observed in other primary and secondary battery systems.

SUMMARY

An embodiment relates to an apparatus including at least one electrochemical flow cell in which the electrochemical flow cell includes an anode electrode, a cathode electrode and a reaction zone between the anode and the cathode. The electrochemical flow cell also includes an electrolyte storage reservoir configured to hold a molten salt electrolyte and a gas generated during charging of the at least one electrochemical flow cell and at least one conduit configured to supply the molten salt electrolyte and the gas from the storage reservoir to the at least one electrochemical flow cell. The electrochemical flow cell also includes at least one pump configured to pump the molten salt electrolyte from the storage reservoir to the reaction zone.

Another embodiment relates to a method of operating an electrochemical system. The method includes pumping a molten salt electrolyte from a first portion of an electrolyte storage reservoir to a stack of electrochemical flow cells and supplying a gas located in a second portion of the electrolyte storage reservoir above the first portion of the electrolyte storage reservoir to the stack of electrochemical flow cells.

DETAILED DESCRIPTION

The embodiments of the present invention relate to an electrochemical system (also sometimes referred to as a "flow battery") that utilizes a metal-halide electrolyte and a halogen reactant, such as molecular chlorine. The halide in the metal halide electrolyte and the halogen reactant can be of the same type in such systems. For example, when the halogen reactant is molecular chlorine, the metal halide electrolyte can contain at least one metal chloride. Conventional flow cell systems provide separate storage tanks for each of the electroactive species and reaction products, especially for system utilizing both liquid and gaseous species. It would be advantageous to have a flow cell configured so that both liquid and gaseous species could be stored in a single storage reservoir.

Embodiments of the present invention include high temperature metal-halogen flow batteries utilizing a non-aqueous (i.e., non-water based) molten salt electrolyte. Preferably, the molten salt electrolyte is substantially water free (e.g. less than 1000 ppm water). The high temperature operation allows the use of both zinc-chlorine (2.12V) and also the implementation of an aluminum-chlorine (3.02V) flow battery. Aluminum-chlorine may be used due to the absence of water that can potentially oxidize the aluminum electrode in an aqueous electrolyte flow battery.

In an embodiment, the molten salt electrolyte may include one or more of $ZnCl_2$, $AlCl_3$, NaCl and KCl. Example electrolyte compositions include, but are not limited to, $ZnCl_2$—NaCl—KCl (e.g. for Zn containing electrodes) and $AlCl_3$—NaCl—KCl (e.g. for Al containing electrodes). Compositions may range from 40 wt %-70 wt % $ZnCl_2$ or $AlCl_3$, 15 wt %-30 wt % NaCl and 15 wt %-30 wt % KCl for improved conductivity. Electrolyte compositions in this range have a melting point below 300° C., other halides, such as LiCl and $LiCl_3$, may also be added to the electrolyte to improve plating quality. Further, 1-1000 ppm additions of lead, tin, antimony, bismuth and/or indium may also be added to the electrolyte to act as leveling additives and further improve metal plating. Manganese may also be added to decrease the melting point of the electrolyte to the range of 100-200° C. $CaCl_2$ may be substituted for part or all of one of NaCl and KCl. If desired, NaCl and/or KCl may be omitted.

Figure 5:
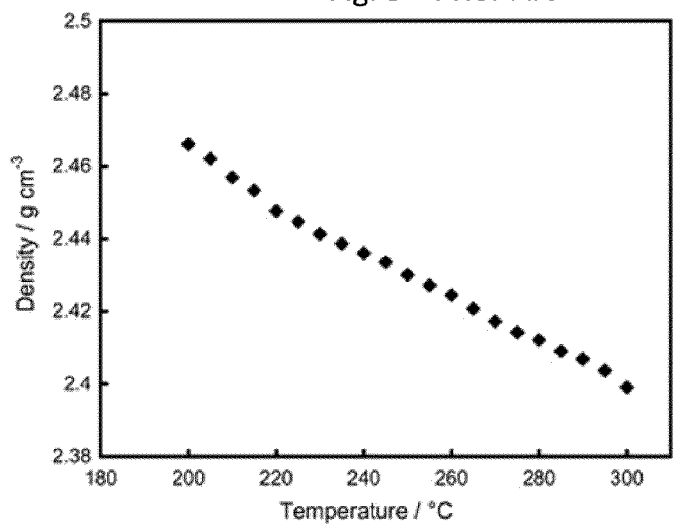
FIG. 5 is a plot of density versus temperature for the $Zn_2$—NaCl—KCl eutectic melt.
Figure 6:
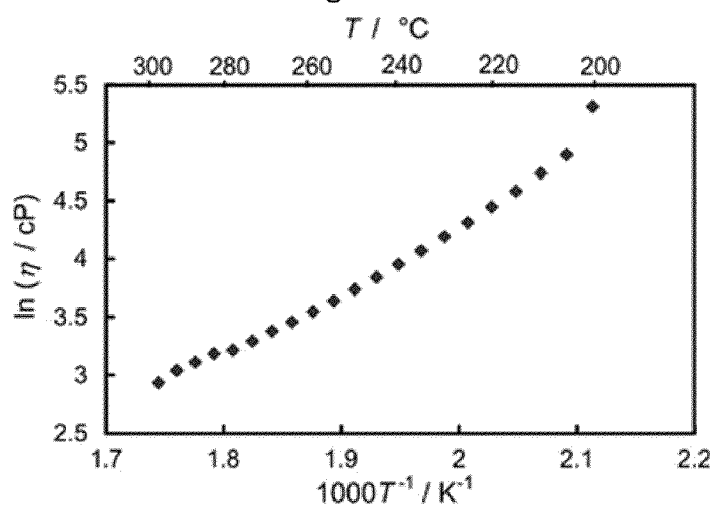
FIG. 6 is an Arrhenius plot of the viscosity of the $Zn_2$—NaCl—KCl eutectic melt.
Figure 7:
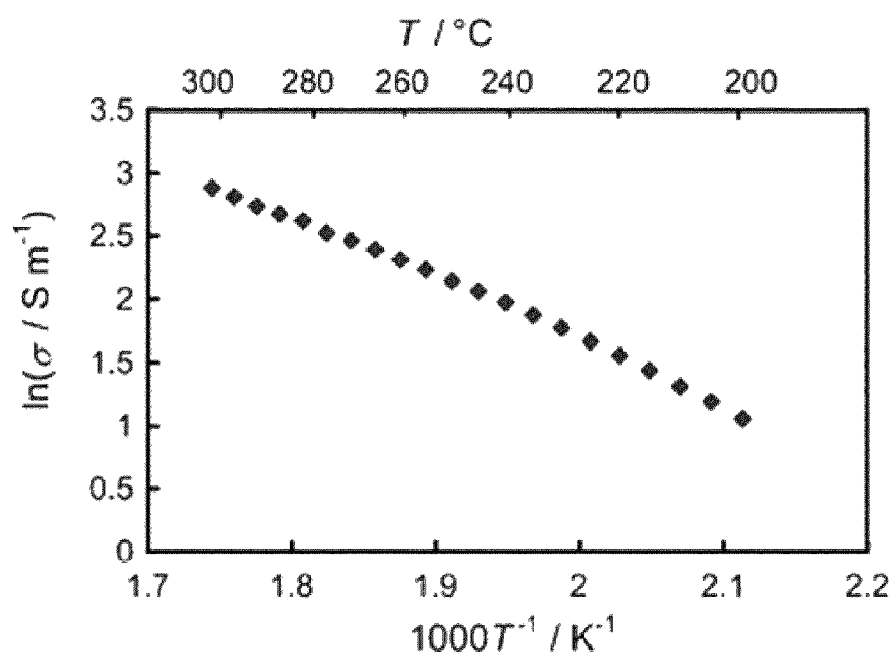
FIG. 7 is an Arrhenius plot of the ionic conductivity for the $Zn_2$—NaCl—KCl eutectic melt.

Preferably, the operating temperature is greater or equal to 100° C., such as 100° C.$\leq$T$\leq$200° C., to ensure liquid state for the electrolyte. As shown in FIGS. 5-7, increasing the operating temperature lowers the density and viscosity of the electrolyte while also increasing the ionic conductivity. Operating at temperatures greater than 100° C. allows for enhanced electrolyte ionic conductivity, improved zinc or aluminum plating morphology and increases the reaction kinetics of the halogen electrode. These improvements may result in higher overall energy efficiency for the flow battery. Reduced ohmic losses in the electrolyte and reduced catalytic losses on the electrodes also may contribute to higher overall energy efficiency for the flow battery. In addition, the elevated operating temperature lowers the solubility of halogen gas (e.g., chlorine or bromine) in the electrolyte because the halogen gas can corrode the zinc or aluminum electrode, causing lower coulombic efficiency. The electrolyte may be pumped from an electrolyte tank together with gaseous or dissolved chlorine into the cell stack to produce electrical power as discussed in more detail below. Additionally, the flow battery may operate at an ambient pressure or be pressurized (P>1 atm). Preferably, the flow battery is pressurized above 1 atm, such as to 10-20 atm, including 20 atm.

Figure 1A:
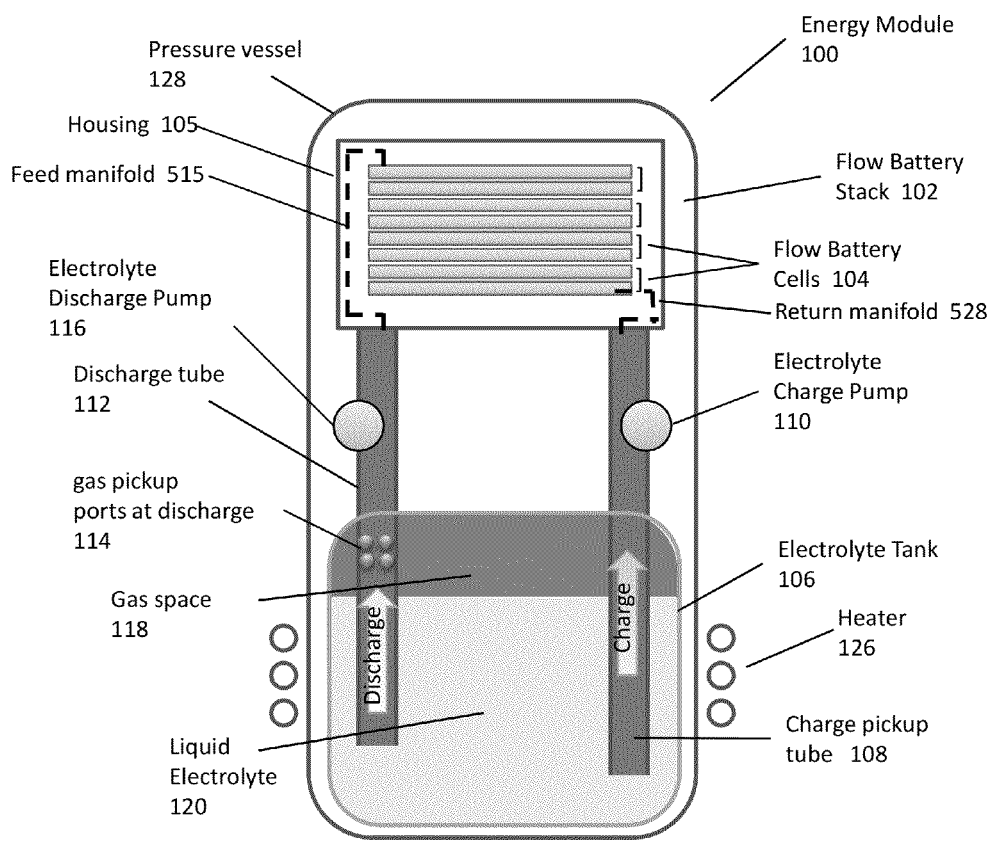
FIG. 1A is a schematic illustration of an embodiment with the electrochemical stack above the molten salt/gas reservoir.

FIG. 1 illustrates an embodiment of an energy module 100 with an electrochemical flow battery stack 102 above the molten salt/gas reservoir 106. The flow battery stack 102 typically includes several individual flow cells 104. For example, the flow battery stack 102 may include, but is not limited to, 1-10 individual flow cells 104. In an embodiment, the flow cells 104 may include a porous electrode (e.g. a mixed metal-oxide ($RuO_2/TiO_2$ catalyst) coated porous titanium mesh or foam positive electrode or anode) and an non-porous electrode (e.g. Zn added initially or in charge mode over a dense titanium plate negative electrode or cathode). The flow cells may also include a frame made of a high temperature tolerant material such as Teflon®, polyvinylidene fluoride (PVDF), glass (e.g., borosilicate glass, soda-lime glass) or ceramic (e.g., aluminum oxide). Examples configurations of stacks of electrochemical cells and stack components that may be used are taught in copending U.S. Patent Application Ser. No. 61/364,631, hereby incorporated by reference. In alternative embodiment, more than 10 flow cells may be included in the flow battery stack 102. Further, in another alternative embodiment, the energy module 100 may include more than one flow battery stack 102. Also, the storage reservoir 106 may include a heater 126. The heater 126 is preferably capable of providing sufficient heat to ensure a liquid state for the electrolyte, such as an operating temperature greater or equal to 100° C., such as 100° C.$\leq T \leq$200° C.

In an embodiment, the energy module 100 includes at least one electrochemical flow cell 104. The electrochemical flow cell 104, e.g. cell 104A illustrated in FIG. 1B and discussed in more detail below, includes an anode electrode 504, a cathode electrode 502 and a reaction zone 506 between the anode 504 and the cathode 502. The energy module 100 also includes an electrolyte storage reservoir 106 configured to hold a molten salt electrolyte 120 and a gas generated during charging of the electrochemical flow cell 104. The energy module 100 further includes at least one conduit 112 configured to supply the molten salt electrolyte 120 and the gas from the storage reservoir 106 to the electrochemical flow cell 104. Additionally, the energy module includes at least one pump 116 configured to pump the molten salt electrolyte 120 from the storage reservoir 106 to the reaction zone 506.

Figure 1B:
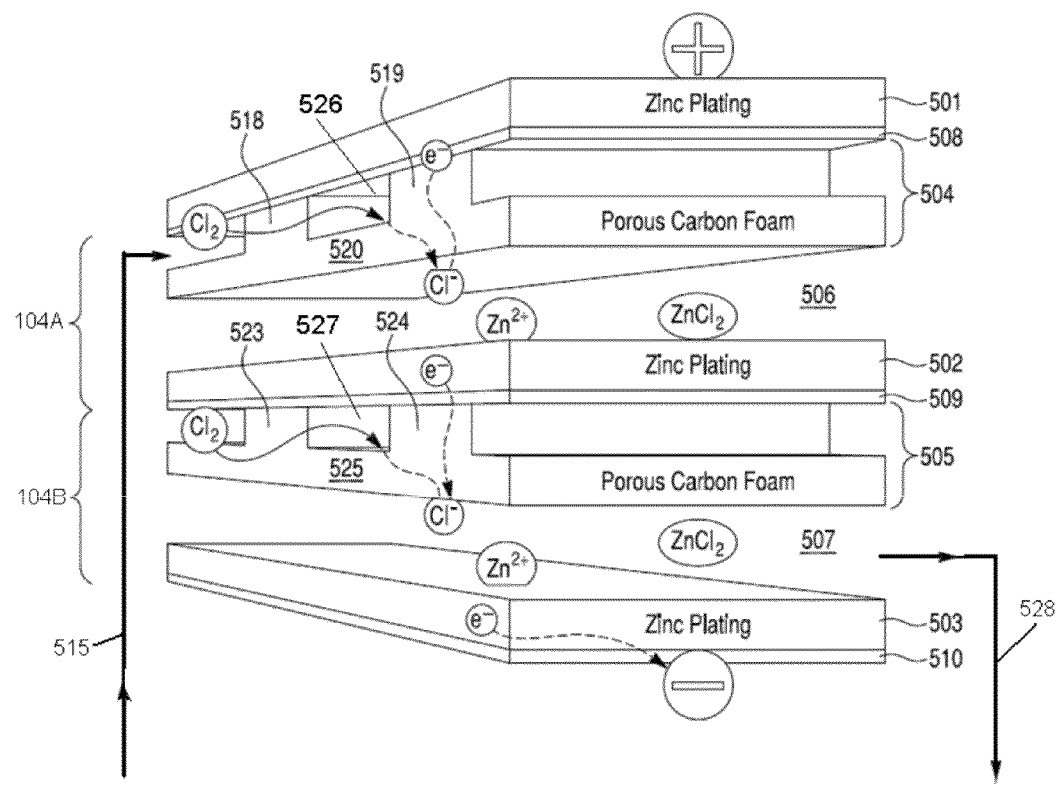
FIG. 1B is a schematic illustration providing details of the flow cells of the electrochemical stack of FIG. 1A.

The flow battery stack 102 and the flow cells 104 are illustrated in more detail in FIG. 1B. The flow battery stack 102 is illustrated with two flow cells 104A, 104B. For illustration only, $ZnCl_2$ is illustrated as an exemplary metal-halide electrolyte and $Cl_2$ as an exemplary halogen reactant. The stack 102 in FIG. 1B includes a first cell 104A which has a reaction zone 506 between a positive electrode 504, e.g., a porous or permeable metal "chlorine" electrode, and a negative electrode 502, e.g., a zinc electrode, and a second cell 104B, which has a reaction zone 507 between a positive electrode 505 and a negative electrode 503. The negative electrode 502 of the cell 104B is electrically connected to the positive electrode 505 of the cell 104A, thereby providing electrical continuity between the cells of the stack. Each of the negative electrodes may comprise a conductive impermeable element, such as a titanium plate. Such element is shown as element 509 for the electrode 502 and element 510 for the electrode 503.

FIG. 1B also shows an electrode 501 or a terminal plate positioned over the positive electrode 504 of the cell 104A. When the cell 104A is the top terminal cell, the electrode 501 can be the terminal positive electrode of the stack. If the cell 104A is not the terminal cell, then the electrode 104A can be a negative electrode of an adjacent cell of the stack. The positive electrodes 504 and 505 are preferably porous electrodes, such as permeable metal electrodes.

In FIG. 1B, the positive electrode 505 of the cell 104B has a porous part 525 and two conductive spacers 523 and 524, which are electrically connected to the negative electrode 502 of the adjacent cell 104A. The conductive spacers 523 and 524 may or may not be made of a porous material. In certain embodiments, conductive spacers, such as spacers 523 and 524, may be made of non-permeable metal. Similarly to the electrode 505, the electrode 504 of the cell 104A contains a porous part 520 and two conductive spacers 518 and 519. An electrolyte flow path 526, 527 exists between adjacent anode and cathode electrodes of adjacent cells. The conductive spacers 518, 519 divide the flow path 526, 527 into flow channels as will be described below. The anode and cathode electrodes of the same cell are separated from each other by one or more insulating spacer(s) (not shown) and/or by the cell housing 116 to create a reaction zone 506, 507 flow path in each respective cell 104A, 104B.

In addition to the cells 521 and 522, FIG. 1B shows: a feed manifold 515 and a return manifold 528 connected with the charge pick-up tube 108 and the discharge tube 112. Together the electrolyte tank 106, the feed manifold 515, the return manifold 528, flow paths 526, 527 and the reaction zone 506, 507 flow paths form a closed loop (e.g. flow circle) for the metal halide electrolyte, which is illustrated as $ZnCl_2$ in FIG. 1B, and the halogen reactant ($Cl_2$ in FIG. 1B).

The energy module 100 also includes a charge tube 108 which extends from the flow battery stack 102 into the molten salt/gas reservoir 106 (e.g., a tank). The charge tube 108 (as well as the discharge tube 112) may be made of a high temperature tolerant material such as Teflon®, PVDF, titanium, borosilicate glass, soda-lime glass, or aluminum oxide. Further, the charge tube 108 (discharge tube 112 and the other components) may be surrounded with thermal insulation (not shown). A lower or first portion of the molten salt/gas reservoir 106 is filled with the molten (liquid) salt electrolyte 120. The molten salt/gas reservoir 106 further includes a gas space or second portion 118 (e.g., for $Cl_2$ gas) above the surface of the molten salt electrolyte 120. The charge tube 108 is configured to be submerged in the molten salt electrolyte 120 such that the charge tube 108 inlet is located in the electrolyte 120 in the lower part of the reservoir 106 while the charge tube 108 outlet is fluidly connect to the return manifold 528. The energy module 100 also includes an electrolyte charge pump 110. On charging the flow battery stack 102, electrolyte 120 is pumped from the molten salt/gas reservoir 106 to the flow battery stack 102 through the charge tube 108 with an electrolyte charge pump 110. That is, the charge tube 108 fluidly connects the reservoir 106 to the stack 102 via the return manifold 528. The charge tube 108 passes through the gas space 118 (second portion of the electrolyte reservoir 106) without being fluidly connected to the gas space 118. Thus, gas in the gas space 118 does not mix with the electrolyte 120 when pumped from the electrolyte tank 106 to the electrode stack 102. Thus, electrolyte 120 that is substantially free (less than 1000 ppm) of gas (e.g. chlorine) may be supplied to the stack 102.

The energy module 100 also includes a discharge tube 112 which extends from the molten salt/gas reservoir 106 to the flow battery stack 102. The discharge tube 112 includes gas pickup ports 114, such as openings, located in the gas space 118. The discharge tube 112 extends from the electrode stack 102 through the gas space 118 to the molten salt electrolyte 120. The discharge tube 112 has an inlet in the molten salt electrolyte 120 and gas pickup ports 114 in the gas space 118. The energy module 100 further includes an electrolyte discharge pump 116. In discharge mode, molten salt electrolyte 120 is pumped from the electrolyte reservoir 106 to the flow battery stack 102 through the discharge tube 112 using electrolyte discharge pump 116. That is, the discharge tube 112, similarly to the charge tube 108, fluidly connects the electrolyte reservoir 106 to the stack 102. Gas in the gas space 118 is added to the electrolyte 120 being pumped to the flow battery stack 102 via the gas pickup ports 114.

In the discharge mode, in an embodiment, a mixture of the metal halide electrolyte 120 and halogen gas reactant arrives from the electrolyte reservoir 106 at the top of a respective positive porous electrode of a flow cell 104 in the flow battery stack 102 via the feed manifold 515. The mixture of the metal halide electrolyte 120 and halogen gas reactant then flows downward through the porous electrode 520 into the reaction zone 506 between the positive porous electrode 504 and the negative electrode 502. Alternatively, the energy module 100 may be configured such that the mixture of the metal halide electrolyte 120 and halogen gas reactant is delivered to the lower reaction zone 507 at the bottom of the flow battery stack 102 via the return manifold 528 and is forced upward through the stack 102.

The halogen reactant is reduced at the positive electrode of the flow cell 104. After the mixture penetrates through a porous positive electrode, it becomes enriched with halogen anions (Cl⁻ in the case of molecular chlorine used as the halogen reactant). In an embodiment, the reaction zone of the cell 104 does not contain a membrane or a separator configured to separate halogen anions, such as Cl⁻, from the metal halide electrolyte. Thus, from the positive electrode, the halogen anion enriched mixture proceeds down to the negative electrode (If the positive electrode is located above the reactions zone and the negative electrode is located below the reaction zone).

In the discharge mode, a metal of the negative electrode is oxidized forming positive ions that are released into the halogen anion enriched mixture. For example, if the negative electrode comprises metallic Zn added before or during operation, the metallic zinc is oxidized into zinc ions, while releasing two electrons. The electrolyte mixture, which is enriched with both halogen anions and metal cations after contacting the negative electrode, leaves the cell through the charge tube 108 and goes back to the electrolyte reservoir 106. In sum, in the system illustrated in FIG. 1, the following chemical reactions can take place in the discharge mode:

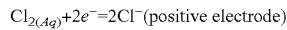

$Cl_{2(Aq)}+2e^-=2Cl^-$ (positive electrode)

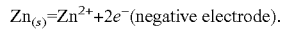

$Zn_{(s)}=Zn^{2+}+2e^-$ (negative electrode).

In the discharge mode, the energy module 100 can consume the halogen reactant and the metal (e.g. Zinc) constituting the negative electrode and produce an electrochemical potential. In the charge mode, the halogen reactant and the metal of the electrode may be replenished by applying a potential to the terminal electrodes of the stack. In the charge mode, the electrolyte 120 from the electrolyte reservoir 106 is moved in a direction opposite to the direction of the discharge mode. For FIG. 1, such opposite movement means that the electrolyte moves counterclockwise.

In the charge mode, the electrolyte 120 enters the cell 104 via charge pickup tube 108. The polarity of the electrodes in charge mode is reversed. Because the charge tube 108 is submerged below the surface of the electrolyte 120 and the halide gas is sequestered into the gas space 118 above the surface of the electrolyte 120, the electrolyte contains little to no dissolved $Cl_2$. This reduces the Zn corrosion rate. That is, the bottom, non-porous electrode in each cell 104, which had been a negative electrode in the discharge mode is a positive electrode in charge mode. At this electrode, the metal ions of the electrolyte 120 may be reduced into elemental metal, which may be deposited back at the electrode. For example, for the system in FIGS. 1 and 2 zinc ions may be reduced and deposited at the non-porous electrode 502, 503 ($Zn^{2+}+2e^-=Zn$). The electrolyte then may pass through a porous electrode 504, 505, where halogen ions of the electrolyte 120 may oxidize to form the molecular halogen reactant. In an embodiment, chlorine ions of the metal halide electrolyte oxidize at the electrodes, forming molecular chlorine.

The electrolyte 120 leaves the cell 104, in a form of a mixture with the formed halogen reactant through the discharge tube 112. A concentration of the metal halide electrolyte 120 in the mixture can be lower than a concentration of the electrolyte that entered the cell from the charge pickup tube 108. From the discharge tube 112, the mixture may enter the electrolyte reservoir 106, where it separates into the halogen reactant 118 and the metal electrolyte 120 using, for example, gravity and an optional sump plate. The halogen gas, being less dense than the liquid electrolyte 120, rises to the gas space 118 above the electrolyte 120 in the electrolyte reservoir 106.

In an embodiment, the flow battery stack 102 and the electrolyte reservoir 106 are located inside a pressure vessel 128. In this manner, the energy module 100 can be operated at elevated pressures. Preferably, the charge tube 108, the charge pump 110, the discharge tube 112 and the discharge pump 116 are also located inside the pressure vessel 128.

Figure 2:
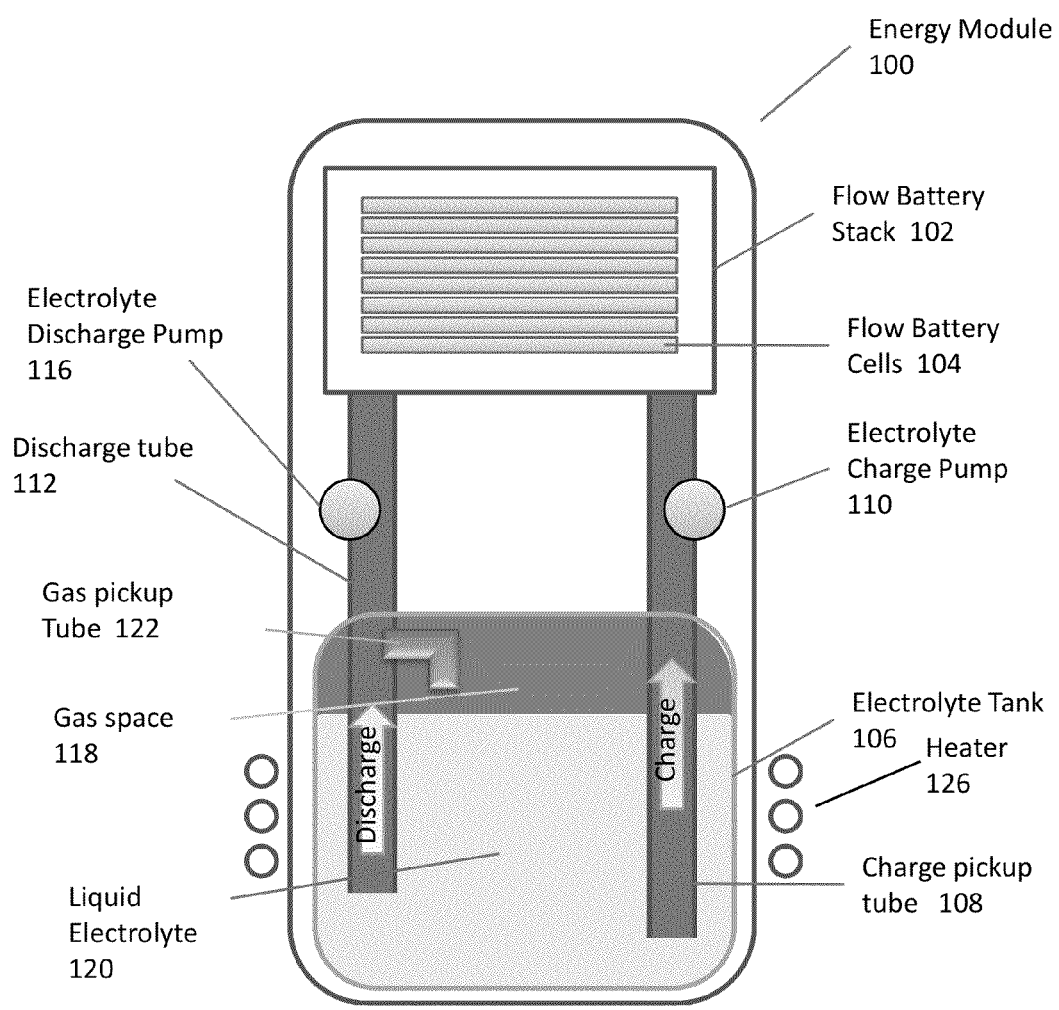
FIG. 2 is a schematic illustration of another embodiment with the electrochemical stack above the molten salt/gas reservoir.

FIG. 2 is a schematic illustration of another embodiment of an energy module 100 with the flow battery stack 102 above the molten salt/gas reservoir 106. In this embodiment, the gas pickup ports 114 have been replaced with a gas pickup tube 122. In the embodiment illustrated in FIG. 1, the amount of gas provided to the discharge pickup tube 112 can be controlled by the number and size of the pickup ports 114. In the embodiment illustrated in FIG. 2, the amount of gas provided to the pickup tube 112 can controlled by the size (diameter), number, and length of the gas pickup tubes 122. In general, the longer the gas pickup tubes 122, the lower the number of tubes 122 and/or the narrower the tubes 122, the less gas will enter the discharge pickup tube 112 per unit time.

Figure 3:
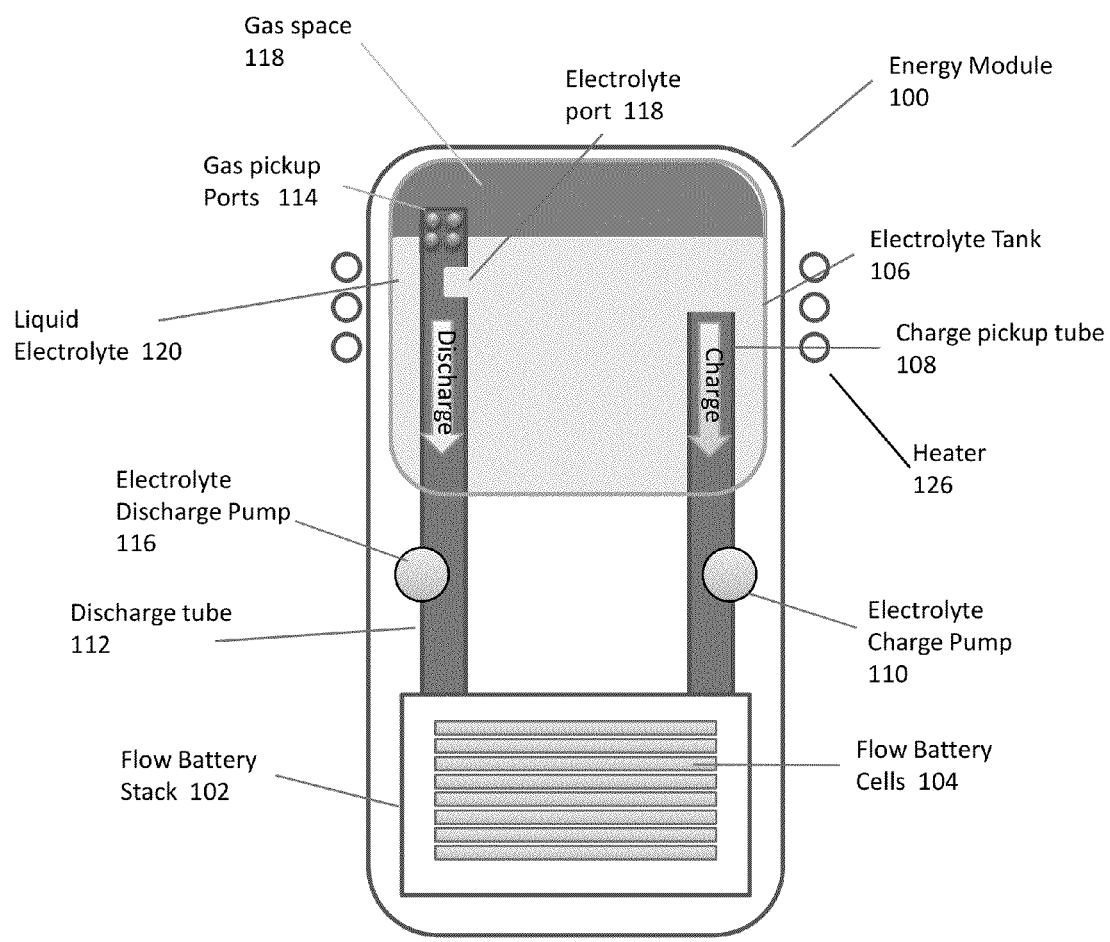
FIG. 3 is a schematic illustration of an embodiment with the electrochemical stack below the molten salt/gas reservoir.

FIG. 3 is a schematic illustration of an embodiment of an energy module 100 with the flow battery stack 102 below the molten salt/gas reservoir 106. In this embodiment, the charge tube 108 extends from the molten salt/gas reservoir 106 to the flow battery stack 102. Further, in this embodiment as in the previous embodiments, the inlet of the charge tube 108 in the molten salt/gas reservoir 106 is submerged below the surface of the electrolyte 120. Additionally, the charge tube 108 does not have an inlet to the gas zone 118 at the top of reservoir 106. The discharge tube 112 extends from the molten salt/gas reservoir 106 to the flow battery stack 102. The end of the discharge tube 112 in the molten salt/gas reservoir 106 extends through the electrolyte 120 to the gas space 118 at the top of the reservoir 106. Further, the discharge tube 112 includes one or more gas pickup port(s) 114 in the gas space 118. The discharge tube 112 also includes an electrolyte opening or port 118 in the side of the discharge tube 112. In this way, both electrolyte 120 and gas can be supplied to the flow battery stack 102.

Figure 4:
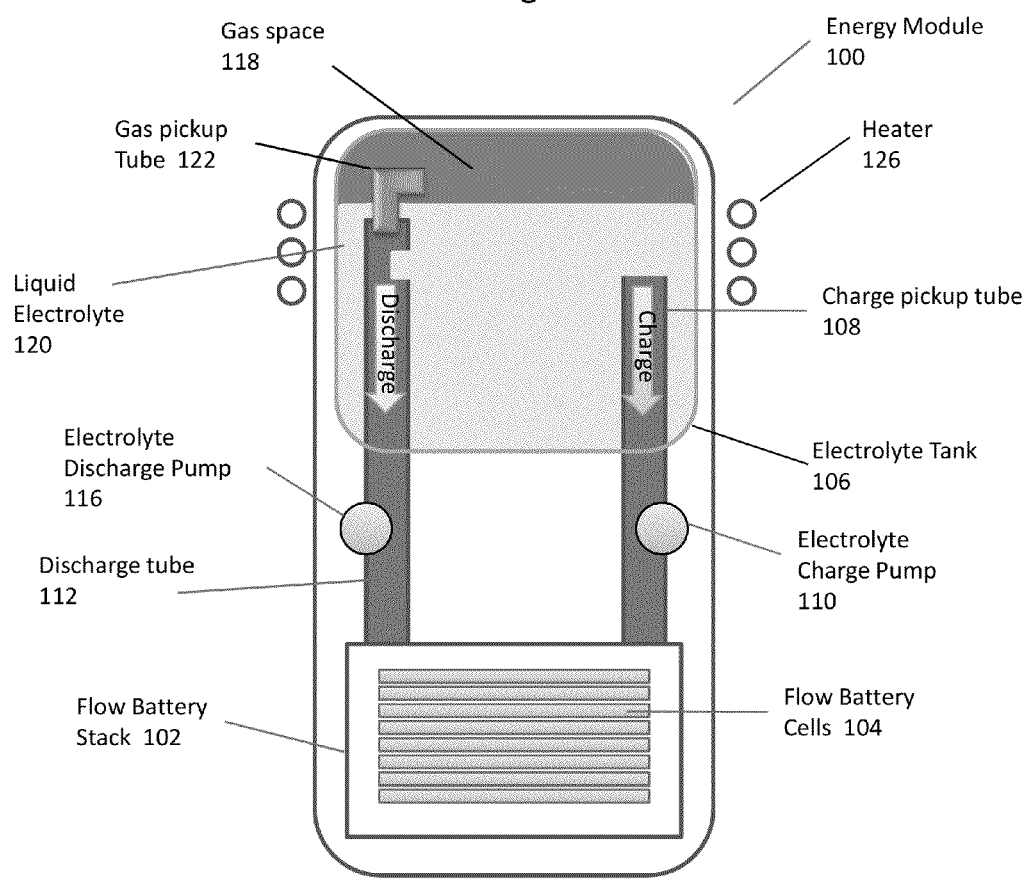
FIG. 4 is a schematic illustration of another embodiment with the electrochemical stack below the molten salt/gas reservoir.

FIG. 4 is a schematic illustration of another embodiment of an energy module 100 in which the flow battery stack 102 is located below the molten salt/gas reservoir 106. In this embodiment, similar to the embodiment illustrated in FIG. 2, the gas pickup ports 114 have been replaced with a gas pickup tube 122, which can be a narrowed tip of discharge tube 112.

In the previous embodiments, the flow battery stack 102 was either above or below the molten salt/gas reservoir 106. Alternatively, the flow battery stack 102 and the molten salt/gas reservoir 106 may be located side by side.

A flow battery utilizing the above electrolyte composition and operating temperatures has improved electrode kinetics and improved the overall energy efficiency relative to convention zinc chloride flow cells. In addition, high-temperature operation improves the uniformity and plating metal at the negative electrode. Moreover, the reduction of dissolved halogen gas in the electrolyte lowers the corrosion rate of the electroplated Zn film to improve the overall coulombic efficiency.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of operating an electrochemical system, comprising:
    pumping a molten salt electrolyte from a first portion of an electrolyte storage reservoir to a stack of electrochemical flow cells; and
    supplying a gas located in a second portion of the electrolyte storage reservoir above the first portion of the electrolyte storage reservoir to the stack of electrochemical flow cells;
    wherein the gas comprises a chlorine gas which is located over the molten salt electrolyte in the storage reservoir; and
    wherein the molten salt electrolyte and the chlorine gas are pumped and supplied to the stack of electrochemical flow cells during a stack discharge mode.

2. The method of claim 1, further comprising pumping the molten salt electrolyte substantially free of the chlorine gas to the stack of electrochemical flow cells during a stack charge mode.

3. The method of claim 2, wherein:
    the molten salt electrolyte and the chlorine gas are pumped and supplied to the stack of electrochemical flow cells during the stack discharge mode through a discharge mode conduit using a discharge mode pump; and
    the molten salt electrolyte substantially free of the chlorine gas is pumped to the stack of electrochemical flow cells during the stack charge mode through a charge mode conduit using a charge mode pump.

4. The method of claim 3, wherein:
    the discharge mode conduit extends into the storage reservoir, such that the discharge mode pump pumps the molten salt electrolyte from the first portion of the storage reservoir into an inlet of the discharge mode conduit located in the first portion of the storage reservoir, and the discharge mode pump supplies the chlorine gas from the second portion of the storage reservoir through a gas inlet into the discharge mode conduit; and
    the charge mode conduit extends into the storage reservoir, such that the charge mode pump pumps the molten salt electrolyte from the first portion of the storage reservoir into an inlet of the charge mode conduit located in the first portion of the storage reservoir.

5. The method of claim 4, wherein:
    the gas inlet comprises one or more supply ports in a portion of the discharge mode conduit located in the second portion of the storage reservoir or one or more gas supply tubes fluidly connecting the discharge mode conduit to the second portion of the storage reservoir; and
    an amount of the chlorine gas supplied to the stack is controlled by selecting at least one of size or number of the ports or by selecting at least one of a number, width and length of the at least one gas supply tubes.

6. The method of claim 1, wherein the molten salt electrolyte comprises at least one of $ZnCl_2$ and $AlCl_3$, and at least one of NaCl, KCl, and $CaCl_2$.

7. The method of claim 1, wherein the stack of electrochemical flow cells and the storage reservoir are maintained at a pressure of 1 atmosphere or above 1 atmosphere.

8. The method of claim 1, further comprising heating the molten salt electrolyte to a temperature above its melting temperature.

9. The method of claim 8, wherein the temperature comprises a temperature between 100 and 300° C.

10. The method of claim 9, wherein the molten salt electrolyte comprises 40-70 mol % $ZnCl_2$ or $AlCl_3$, 15-30 mol % NaCl and 15-30 mol % KCl.

11. The method of claim 10, wherein the molten salt electrolyte further comprises at least one of $LiCl_3$, Mn, Pb, Sn, Sb, Bi and In, and wherein the molten salt electrolyte is substantially water free.

* * * * *